United States Patent
Desai et al.

(10) Patent No.: US 10,872,059 B2
(45) Date of Patent: Dec. 22, 2020

(54) SYSTEM AND METHOD FOR MANAGING SNAPSHOTS OF STORAGE OBJECTS FOR SNAPSHOT DELETIONS

(71) Applicant: VMware, Inc., Palo Alto, CA (US)

(72) Inventors: Asit Desai, Cupertino, CA (US); Derek Uluski, Weymouth, MA (US); Alexander T. Garthwaite, South Hamilton, MA (US); Sunil Satnur, Cupertino, CA (US); Ilya Languev, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 201 days.

(21) Appl. No.: 16/112,704

(22) Filed: Aug. 25, 2018

(65) Prior Publication Data

US 2020/0065400 A1  Feb. 27, 2020

(51) Int. Cl.
*G06F 16/11* (2019.01)
(52) U.S. Cl.
CPC .................................. *G06F 16/128* (2019.01)
(58) Field of Classification Search
CPC .. G06F 16/184; G06F 11/1448; G06F 16/219; G06F 16/10; G06F 3/1285; G06F 11/1453; G06F 3/0619; G06F 16/11; G06F 16/134; G06F 16/128; G06Q 10/06
See application file for complete search history.

(56) References Cited

U.S. PATENT DOCUMENTS

| | | | | |
|---|---|---|---|---|
| 7,831,639 | B1* | 11/2010 | Panchbudhe | G06F 16/10 707/816 |
| 10,359,952 | B1* | 7/2019 | Aron | G06F 3/0619 |
| 2005/0131964 | A1* | 6/2005 | Saxena | G06F 16/219 |
| 2014/0156602 | A1* | 6/2014 | Adkins | G06F 16/11 707/649 |
| 2016/0004290 | A1* | 1/2016 | Bukhin | G06Q 10/06 700/291 |
| 2016/0210302 | A1* | 7/2016 | Xia | G06F 3/1285 |
| 2017/0212915 | A1* | 7/2017 | Borate | G06F 11/1453 |
| 2018/0181584 | A1* | 6/2018 | Bestler | G06F 16/134 |
| 2018/0267985 | A1* | 9/2018 | Badey | G06F 16/184 |
| 2019/0034294 | A1* | 1/2019 | Tirado | G06F 11/1448 |

* cited by examiner

*Primary Examiner* — Etienne P Leroux
(74) *Attorney, Agent, or Firm* — Loza & Loza, LLP (57) ABSTRACT

System and method for managing snapshots of storage objects stored in a storage system uses a storage structure that includes both a storage object and any snapshots of the storage object. When a request to delete the storage object is received, the storage structure that includes the storage object is checked to determine if there is at least one snapshot in the storage structure. After determining that there is at least one snapshot in the storage structure, the storage object is marked as being delete designated without deleting the storage structure. After determining that there is no snapshot in the storage structure, the storage structure is deleted.

20 Claims, 11 Drawing Sheets

SYSTEM AND METHOD FOR MANAGING SNAPSHOTS OF STORAGE OBJECTS FOR SNAPSHOT DELETIONS

BACKGROUND

Snapshot technology is commonly used to preserve point-in-time (PIT) state and data of a virtual computing instance (VCI), such as a virtual machine. Snapshots of virtual computing instances are used for various applications, such as VCI replication, VCI rollback and data protection for backup and recovery.

Current snapshot technology can be classified into two types of snapshot techniques. The first type of snapshot techniques includes redo-log based snapshot techniques, which involve maintaining changes for each snapshot in separate redo logs. A concern with this approach is that the snapshot technique cannot be scaled to manage a large number of snapshots, for example, hundreds of snapshots. In addition, this approach requires intensive computations to consolidate across different snapshots.

The second type of snapshot techniques includes tree-based snapshot techniques, which involves creating a chain or series of snapshots to maintain changes to the underlying data using a B tree structure, such as a B+ tree structure. A significant advantage of the tree-based snapshot techniques over the redo-log based snapshot techniques is the scalability of the tree-based snapshot techniques. However, the snapshot structure of the tree-based snapshot techniques is intertwined and complex, especially when snapshot sizes and snapshot numbers are large. Thus, an important aspect of a snapshot system using a tree-based snapshot technique is managing the snapshots.

BRIEF DESCRIPTION OF THE DRAWINGS

Throughout the description, similar reference numbers may be used to identify similar elements.

DETAILED DESCRIPTION

Figure 1:
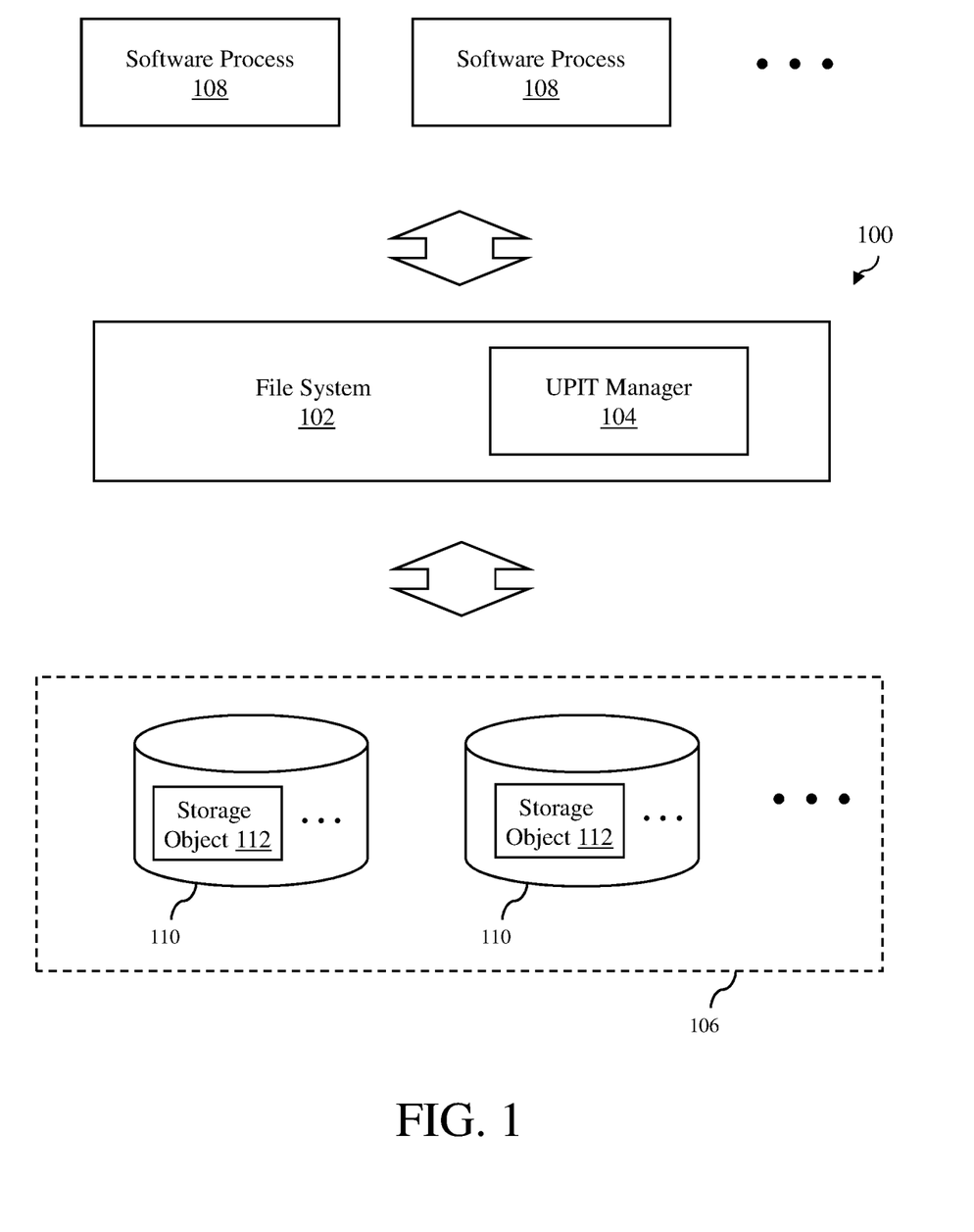
FIG. 1 is a block diagram of a computer system in accordance with an embodiment of the invention.

FIG. 1 depicts a computer system 100 in accordance with an embodiment of the invention. The computer system 100 is shown to include a file system 102 with a universal point-in-time (UPIT) manager 104 and a storage system 106. Other components of the computer system 100 that are commonly found in conventional computer systems, such as memory and processors, are not shown in FIG. 1. The computer system 100 allows software processes 108 to perform file system operations, such as creating/reading/writing/deleting data in the storage system 106, e.g., directories, folders, files and other storage objects, and to perform snapshot operations, such as creating/deleting snapshots of the data in the storage system 106. As described in detail below, the computer system 100 operates to manage snapshots of storage objects to ensure consistency and prevent data corruptions as snapshots of storage objects are created and deleted.

The software processes 108 can be any software program, applications or software routines that can run on one or more computers, which can be physical computers, virtual computers, such as VMware virtual machines, or distributed computer systems. The software processes 108 may initiate various data storage operations, such as read, write, delete and rename operations, for data stored in the storage system 106, which are then executed by the computer system 100. In addition, the software processes 108 may also initiate various snapshot operations, such as creating and deleting snapshots for data stored in the storage system 106.

The storage system 106 includes one or more computer data storage devices 110, which are used by the computer system 100 to store data, including metadata of storage objects 112 and actual data of the storage objects 112. In some embodiments, a single storage object may be distributed among multiple storage devices. The data storage devices can be any type of non-volatile storage devices that are commonly used for data storage. As an example, the data storage devices may be, but not limited to, solid-state devices (SSDs), hard disks or a combination of the two.

In an embodiment, the storage system 106 may be a local storage system of the computer system 100, such as hard drive disks in a physical server-grade computer. In another embodiment, the storage system 106 may be a distributed storage system such as a storage area network (SAN). In still another embodiment, the storage system 106 may be a collection of local storage systems of physical computers (not shown) in the computer system 100, such as hard drive disks in a personal computer system, which forms a virtual SAN. In still another embodiment, the storage system 106 may be a remote storage system that can be accessed via a network, such as a network-attached storage (NAS). Depending on the embodiment, the storage system 106 may include other components commonly found in those types of storage systems, such as network adapters, storage drivers and/or storage management servers. The storage system 106 may be scalable, and thus, the number of data storage devices 110 included in the storage system can be changed as needed to increase or decrease the capacity of the storage system to support increase/decrease in workload. Consequently, the exact number of data storage devices 110 included in the storage system 106 can vary from one to hundreds or more.

The storage system 106 may be used to store data in any logical storage units, such as file systems, files, groups of files, datastores, logical unit number (LUN) objects and virtual volumes (VVOLs). In addition, the storage system 106 may be used to store snapshots of any of these logical storage units or snapshots of applications using the data storage, such as virtual computing instances. As used herein, the term "virtual computing instance" is any software entity that can run on a computer system, such as a software application, a software process, a virtual machine and a "container" that provides system-level process isolation, such as a Docker container. Snapshots of virtual computing instances can be viewed as "images" of the virtual computer instances at the time when the snapshots were taken or created. As an example, a snapshot of a virtual machine is a copy of the non-volatile memory or virtual disk of the virtual machine, as well as the volatile memory of the virtual machine, at the time the snapshot was taken. A virtual machine snapshot may also include the configuration or settings of the virtual machine and the BIOS configuration at the time the snapshot was taken.

The file system 102 operates to manage file system operations to and from the software processes 108 and the storage system 106 for storage objects, such as file system volumes, file directories/folders, and files, for shared use of the storage system 106. Thus, the file system 102 organizes the storage resources of the storage system 106 into the file system structures so that the software processes 108 can access the storage objects for various storage operations, such as creating file system objects, deleting file system objects, writing or storing file system objects, reading or retrieving file system objects and renaming file system objects.

The UPIT manager 104 of the file system 102 operates to manage snapshots of storage objects stored in the storage system 106. The UPIT manager 104 manages the creation and deletion of snapshots of storage objects stored in the storage system. The UPIT manager 104 also supports various bookkeeping operations with respect to the snapshots, such as generating identifiers for the snapshots. As explained in more detail below, at least some storage objects and their snapshots are maintained in storage structures referred to herein as UPIT structures, which are stored in the storage system 106, such that each storage object and its snapshots are contained in a single storage structure. The UPIT manager 104 interacts with the UPIT structures to ensure snapshots are created and deleted in these UPIT structures.

Figure 2A:
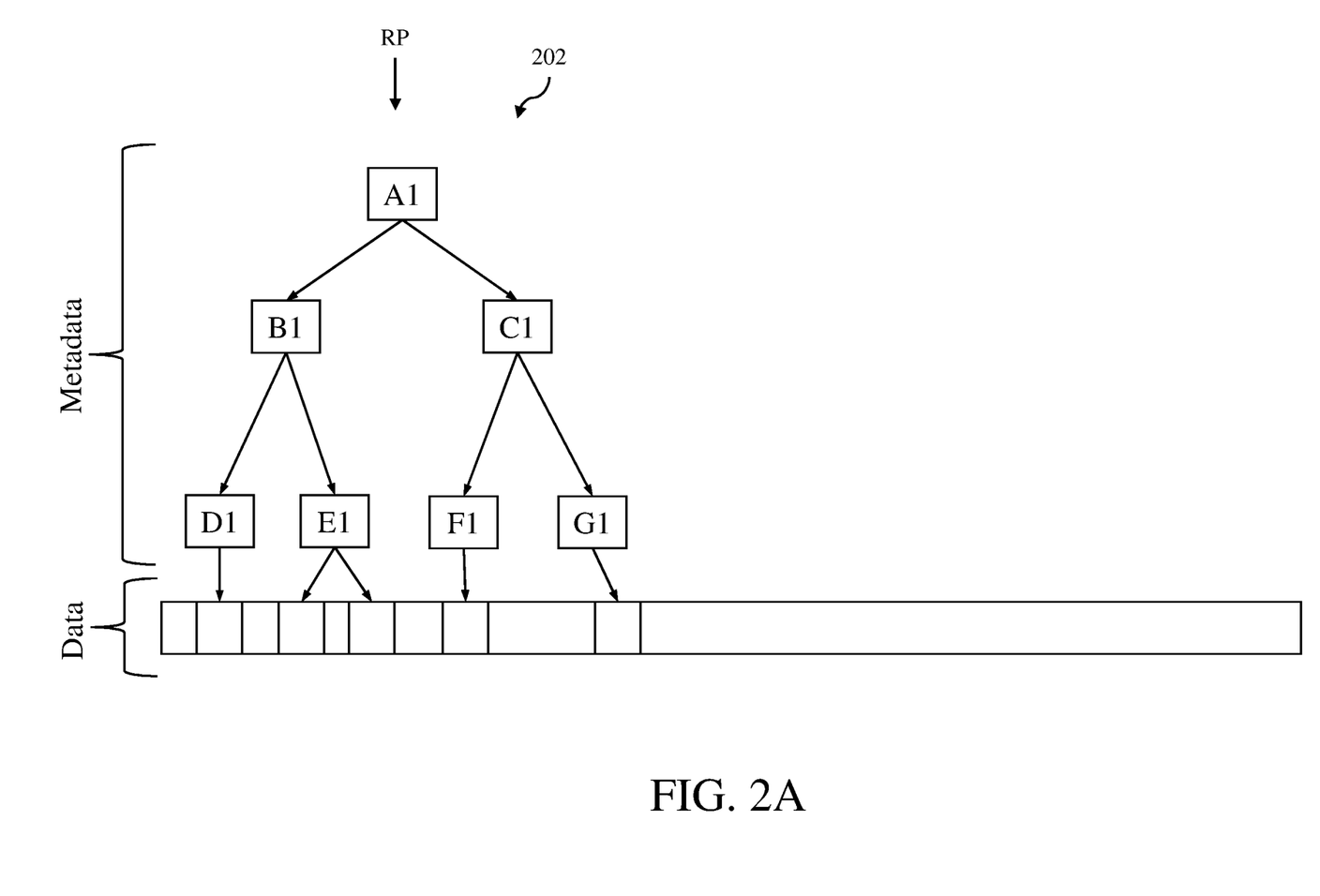
FIGS. 2A-2C illustrate a copy-on-write (COW) B+ tree structure for one storage object managed by a UPIT manager of the computer system in accordance with an embodiment of the invention.
Figure 2B:
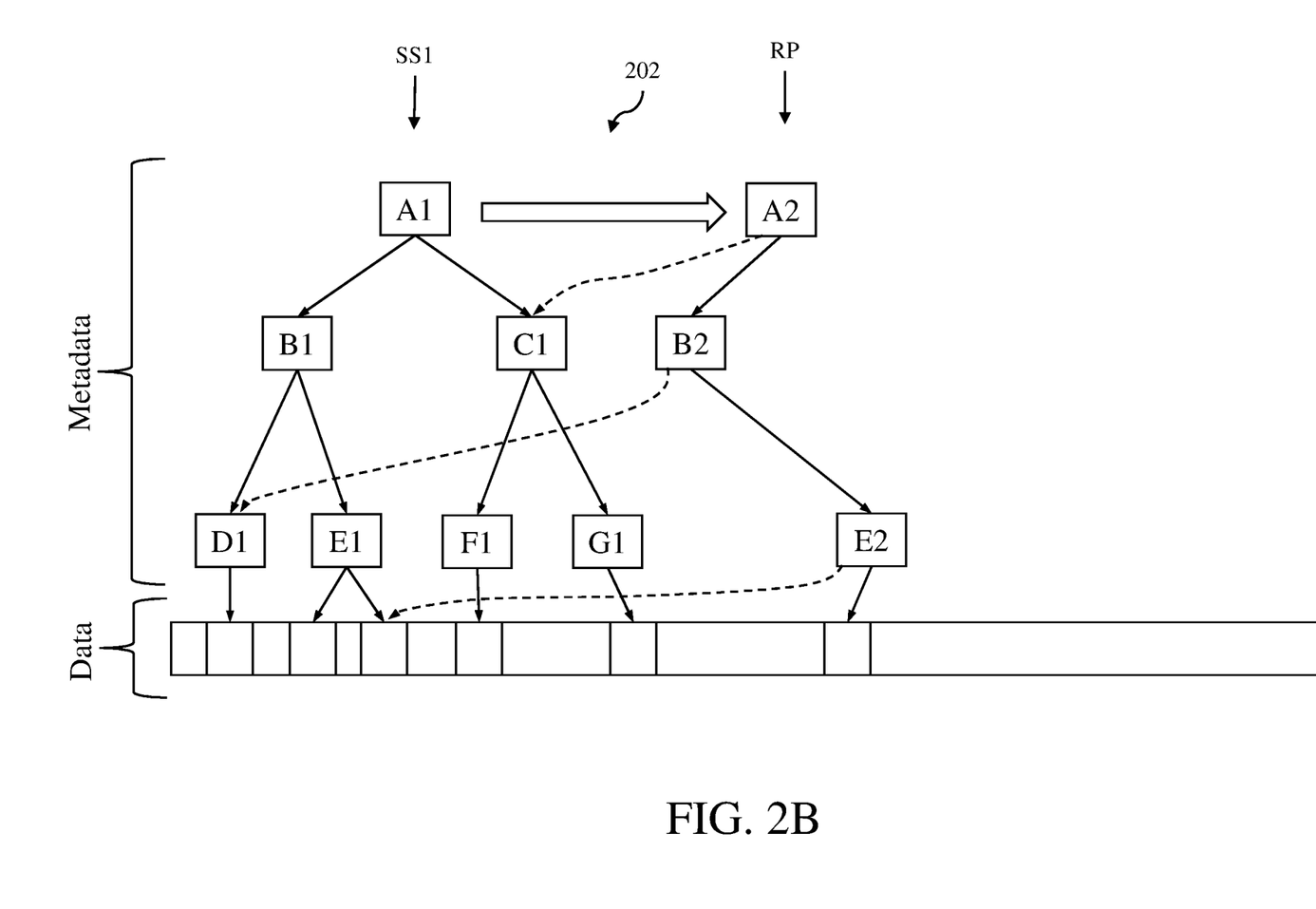
Figure 2C:
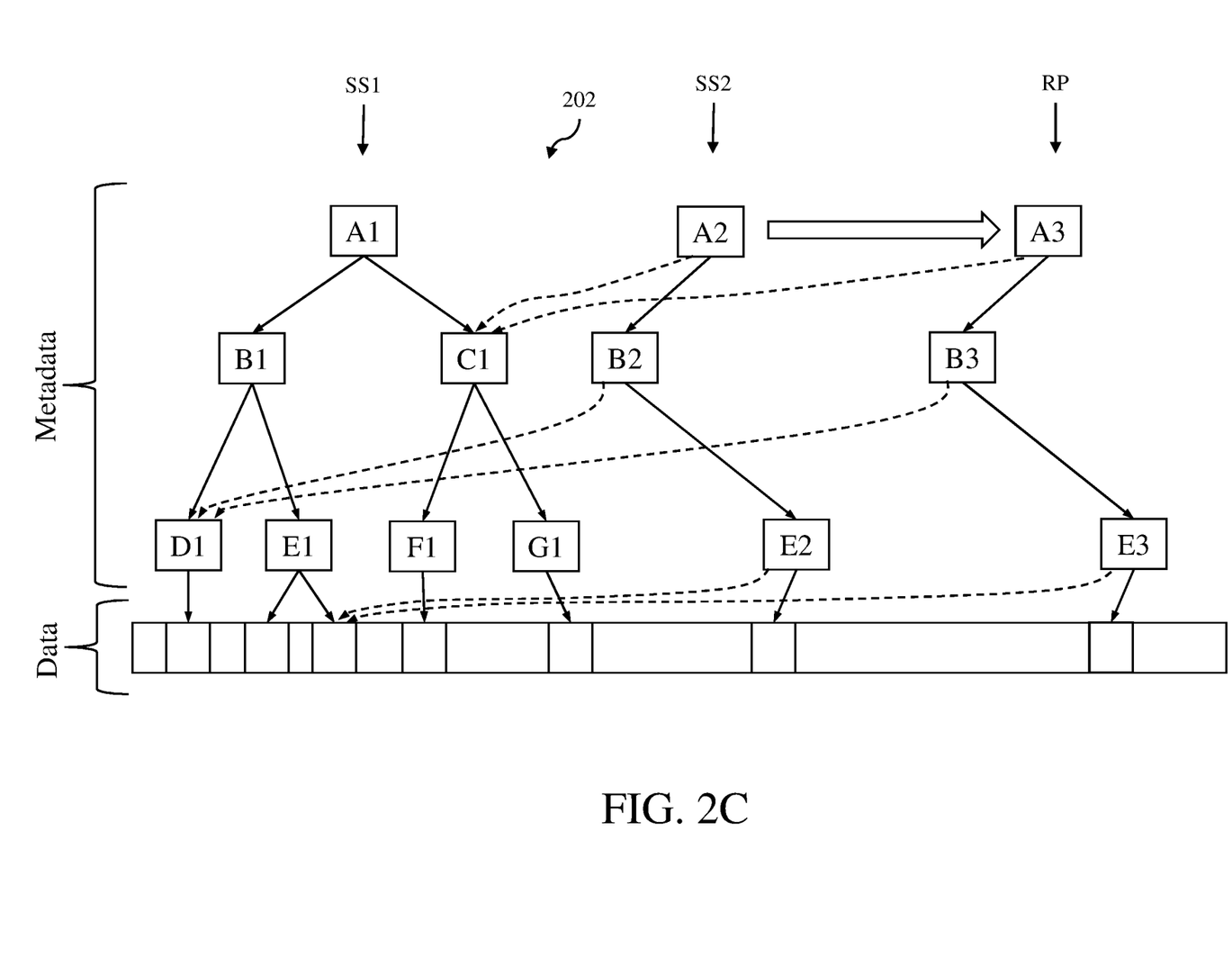

The UPIT manager 104 leverages B tree structures, such as copy-on-write (COW) B+ tree structures, to organize storage objects and their snapshots taken at different times. A COW B+ tree structure for one storage object managed by the UPIT manager 104 in accordance with an embodiment of the invention is illustrated in FIGS. 2A-2C. In this embodiment, the storage object includes data, which is the actual data of the storage object, and metadata, which is information regarding the COW B+ tree structure used to store the actual data in the storage system 106.

FIG. 2A shows the storage object before any snapshots of the storage object were taken. The storage object comprises data, which is stored in data blocks in the storage system 106, as defined by a B+ tree structure 202. Currently, the B+ tree structure 202 includes nodes A1-G1, which define one tree of the B+ tree structure (or one sub-tree if the entire B+ tree structure is viewed as being a single tree). The node A1 is the root node of the tree. The nodes B1 and C1 are index nodes of the tree. The nodes D1-G1 are leaf nodes of the tree, which are nodes on the bottom layer of the tree. As snapshots of the storage object are created, more root, index and leaf nodes, and thus, more trees may be created. Each root node contains references that point to index nodes. Each index node contains references that point to other index nodes. Each leaf node records the mapping from logic block address (LBA) to the physical location or address in the storage system. Each node in the B+ tree structure may include a node header and a number of references or entries.

The node header may include information regarding that particular node, such as an identification (ID) of the node. Each entry in the leaf nodes may include an LBA, the entry type (e.g., private or shared), physical extent location, checksum and other characteristics of the data for this entry. In FIG. 2A, the nodes A1-G1 are modifiable. Thus, the tree with the nodes A1-G1 can be viewed as the current state or running point (RP) of the storage object.

FIG. 2B shows the storage object after a first snapshot SS1 of the storage object was taken. Once the first snapshot SS1 is created or taken, all the nodes in the B+ tree structure become immutable (i.e., cannot be modified). In FIG. 2B, the nodes A1-G1 have become immutable, preserving the storage object to a point in time when the first snapshot SS1 was taken. Thus, the tree with the nodes A1-G1 can be viewed as the first snapshot SS1. In an embodiment, the first snapshot of a storage object may include a snapshot generation identification, such as a number, and data regarding all the nodes in the B+ tree structure, e.g., the nodes A1-G1 in the example shown in FIG. 2B. When a modification of the storage object is made, after the first snapshot is created, a new root node and one or more index and leaf nodes are created. In FIG. 2B, new nodes A2, B2 and E2 have been created after the first snapshot SS1 was taken, which now define the running point of the storage object. Thus, the nodes A2, B2 and E2, as well as the nodes C1, D1, F1 and G1, which are common nodes for both the first snapshot SS1 and the current running point, represent the current state of the storage object.

FIG. 2C shows the storage object after a second snapshot SS2 of the storage object was taken. As noted above, once a snapshot is created or taken, all the nodes in the B+ tree structure become immutable. Thus, in FIG. 2C, the nodes A2, B2 and E2 have become immutable, preserving the storage object to a point in time when the second snapshot SS2 was taken. Thus, the tree with the nodes A2, B2, E2, C1, D1, F1 and G1 can be viewed as the second snapshot. In an embodiment, any snapshot of a storage object after the first snapshot include a snapshot generation identification, such as a number, and data regarding nodes in the B+ tree structure that differ from the previous snapshot of the storage object, e.g., the nodes A2, B2 and E2 in the example shown in FIG. 2C. When a modification of the storage object is made after the second snapshot SS2 is created, a new root node and one or more index and leaf nodes are created. In FIG. 2C, new nodes A3, B3 and E3 have been created after the second snapshot was taken. Thus, nodes A3, B3 and E3, as well as the nodes C1, D1, F1 and G1, which are common nodes for both the second snapshot and the current running point, represent the current state of the storage object.

Figure 3A:
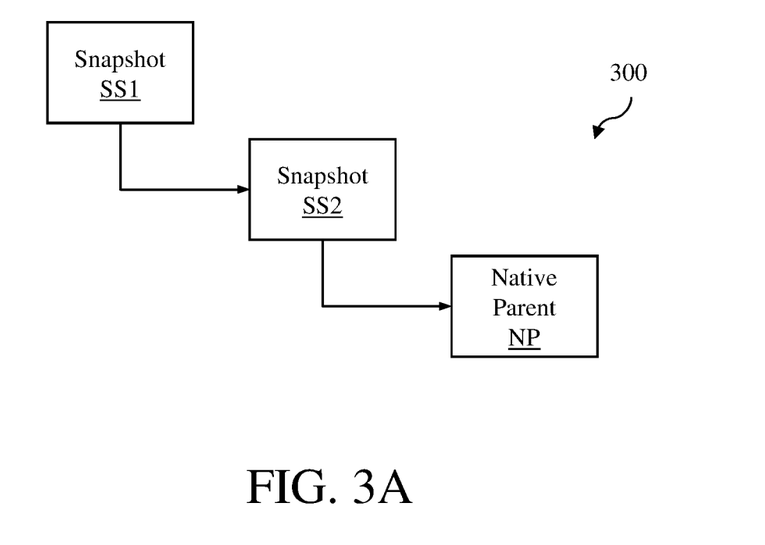
FIGS. 3A and 3B illustrate snapshot hierarchy and relationship in accordance with an embodiment of the invention.

In this manner, multiple snapshots of a storage object can be created at different times. These multiple snapshots create a hierarchy of snapshots. FIG. 3A illustrates a hierarchy 300 of snapshots for the example described above with respect to FIGS. 2A-2C. As shown in FIG. 3A, the hierarchy 300 includes a first snapshot SS1, a second snapshot SS2 and a native parent NP. The native parent NP is the current state of the storage object, which is the same as the running point for the storage object. Thus, the snapshot hierarchy 300 illustrates how snapshots of a storage object can be visualized.

Figure 3B:
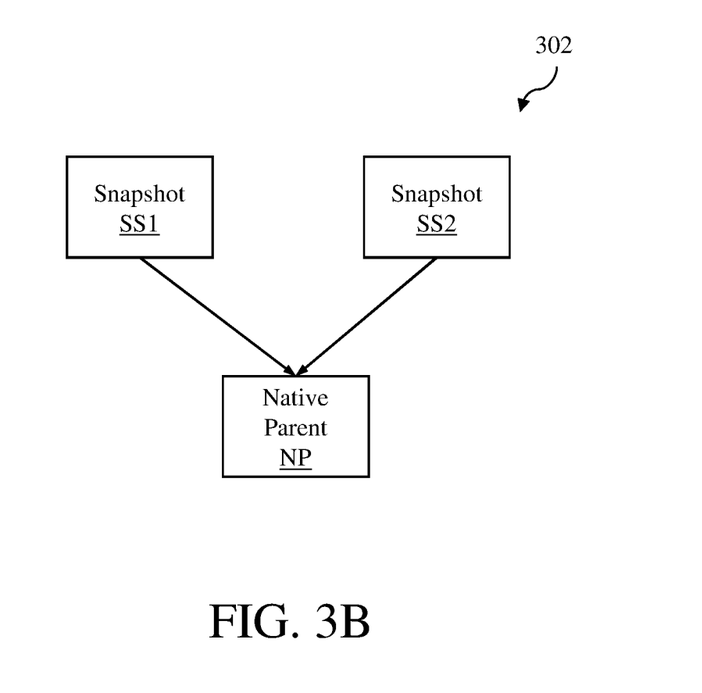

Each snapshot of a storage object can be viewed as a child of a native parent since each snapshot is a point-in-time representation of the native parent and is derived from the native parent. In an embodiment, all the snapshots of a storage object can be referenced by the storage object. Thus, the storage object can maintain a record of the snapshots of the storage object. This relationship 302 is illustrated in FIG.

3B, which shows that the first and second snapshots SS1 and SS2 are referenced by the native parent NP.

Unlike conventional snapshots of storage objects, which are maintained as separate storage objects, the file system 102 and the UPIT manager 104 use a single storage structure to store the native parent and all referenced snapshots for each storage object. Thus, all the information regarding all the snapshots of a storage object is contained in the single structure, which will be referred to herein as universal point-in-time (UPIT) structure. In an embodiment, the UPIT structure includes a directory of snapshots contained in the UPIT structure.

Figure 4:
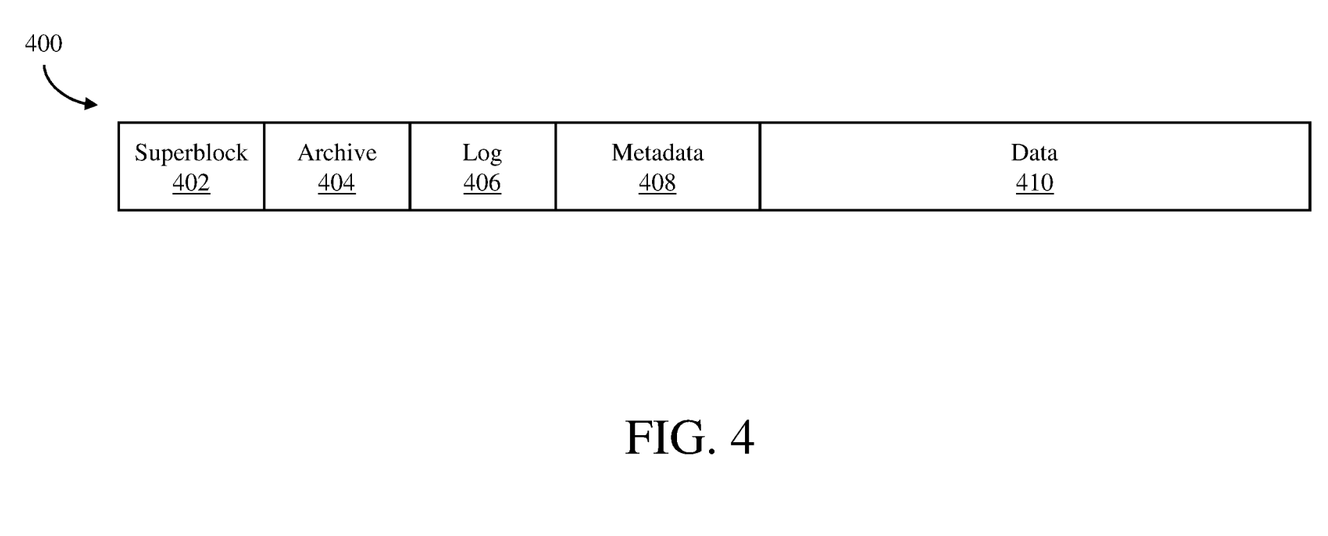
FIG. 4 is a block diagram of a universal point-in-time (UPIT) structure in accordance with an embodiment of the invention.

Turning now to FIG. 4, a UPIT structure 400 in accordance with an embodiment of the invention is shown. The UPIT structure 400 includes a superblock section 402, an archive section 404, a log section 406, a metadata section 408 and a data section 410. The superblock section includes information regarding checkpointing information. The archive section includes information regarding historical and current snapshots, such as creation and deletion of snapshots at different points in time. The log section includes logs of input/output (I/O) operations for the UPIT structure 400 (e.g., insert and delete data operations). The metadata section includes information regarding the nodes of the B+ tree structure being used to store the data. Thus, the metadata section includes all the nodes of the snapshots and the native parent, some of which are shared by the snapshots and the native parent. The data section includes the data being stored in the UPIT structure. Thus, the data section includes data for the snapshots and the native parent. In this embodiment, the UPIT structure is composed of a single file. However, in other embodiments, the UPIT structure may be composed of multiple files, where the first file of the UPIT structure will be similar to the UPIT structure 400 shown in FIG. 4, but other files of the UPIT structure may only include a metadata section and a data section.

The file system 102 and the UPIT manager 104 allow multiple software processes to create snapshots for a storage object in UPIT structures. Thus, a UPIT structure for a particular storage object may include some snapshots created by one software process and other snapshots created by another software process. For a storage object of a virtual machine, such as a namespace object (where descriptor files for the virtual machine are stored) and a virtual disk object (where a virtual disk of the virtual machine is stored), a virtualization software in a host computer supporting that virtual machine may create snapshots in the UPIT structure for that storage object, some of which may be directed by a user of the virtualization software, and a data protection module, running on any computer system, may create additional snapshots for the storage object in the same UPIT structure. In this use case, the snapshots created by the data protection module may be hidden and not visible to the user of the virtualization software since this may overwhelm the user with numerous snapshots that the user did not create. Thus, the user is not aware of the snapshots that have been created by the data protection module. This use case is illustrated in FIG. 5.

Figure 5:
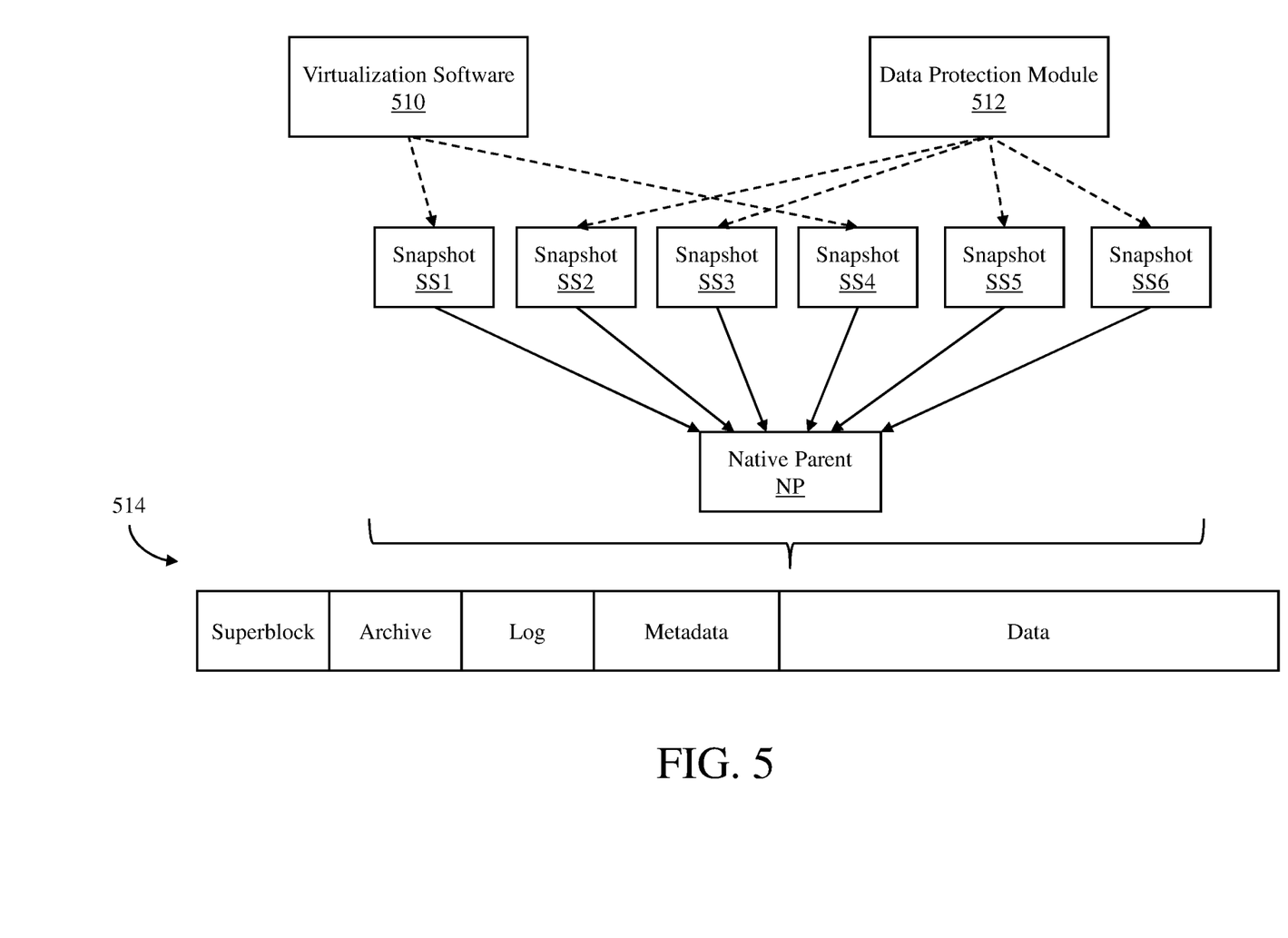
FIG. 5 illustrates snapshots of a storage object in a UPIT structure that have been created by different software processes in accordance with an embodiment of the invention.

FIG. 5 shows a virtualization software 510, which is supporting a virtual machine (not shown), and a data protection module 512 that have created snapshots in a UPIT structure 514 for a virtual disk object of the virtual machine. In this example, the virtualization software 510 has created two snapshots SS1 and SS4 in response to user input, and the data protection module 512 has created four snapshots SS2, SS3, SS5 and SS6. These snapshots are illustrated as a snapshot hierarchy contained in the UPIT structure. Thus, these snapshots are referenced by a native parent NP. In addition, each of these snapshots are typically dependent on the native parent NP for at least some of the B+ tree nodes. Thus, the native parent NP cannot be deleted if there are any snapshots remaining. However, since a user of the virtualization software 512 does not know about the snapshots SS2, SS3, SS5 and SS6 created by the data protection module 512, if the user wants to delete the VM and enters instructions to do so, the UPIT structure 514 should not be deleted by the UPIT manager 104 unless the snapshots SS2, SS3, SS5 and SS6 created by the data protection modules are first deleted.

The file system 102 and the UPIT manager 104 resolve this potential data corruption issue by managing UPIT structures so that native parents or running points (RPs) of storage objects in UPIT structures are only deleted when their reference to snapshots drops to zero, i.e., there are snapshots associated with the storage object RPs. In an embodiment, the UPIT manager 104 will read the archive section of a UPIT structure to see if there are any snapshot references, which are recorded when snapshots are created in the UPIT structure. Each snapshot references may include at least a snapshot identification and a generation number, which indicates when the snapshot was created in the UPIT structure relative to other snapshots. If there are no snapshot references in the archive section of the UPIT structure, the UPIT manager 104 will know that the UPIT structure has no snapshots and the storage object RP can be deleted. However, if there are one or more snapshot references in the archive section of the UPIT structure, the UPIT manager will know that the UPIT structure has at least one snapshot. If there are any snapshots remaining when the file system 102 is instructed to delete a storage object RP in a UPIT structure, e.g., VM deletion by a user, the file system will acknowledge the delete request and mark the storage object RP as being delete designated, but the storage object RP will not actually be deleted. That is, the storage object RP will appear to have been deleted from the UPIT structure to the requesting software process, but the actual data that forms the storage object RP will not be deleted from the storage system 106. Only after all the snapshots in the UPIT structure have been deleted will the storage object RP be actually deleted.

In some use cases, even a snapshot in a UPIT structure may be prevented from actually being deleted from the UPIT structure if that snapshot is used by another entity, such as a linked clone. A linked clone is a copy of a storage object, such as a namespace or virtual disk object of a virtual machine, created from a snapshot of that storage object, which may be stored in another UPIT structure. Thus, a linked clone has access to all the files of the parent storage object, but all these files of the parent storage object are not copied when the linked clone is created. When a linked clone is created from a snapshot of a UPIT structure, that snapshot will have a reference to the linked clone. Thus, the UPIT manager 104 can readily determine that a snapshot is associated with one or more linked clones. Since a linked clone is dependent on a snapshot, if a request is made to the file system 102 to delete that snapshot in a UPIT structure without deleting the linked clone first, the UPIT manager 104 will acknowledge the delete request and mark the snapshot as being delete designated, but the snapshot will not actually be deleted from the UPIT structure. That is, the snapshot will appear to have been deleted to the requesting software process, but the actual data that forms the snapshot will not be deleted from the UPIT structure. This use case is illustrated in FIG. 6.

Figure 6:
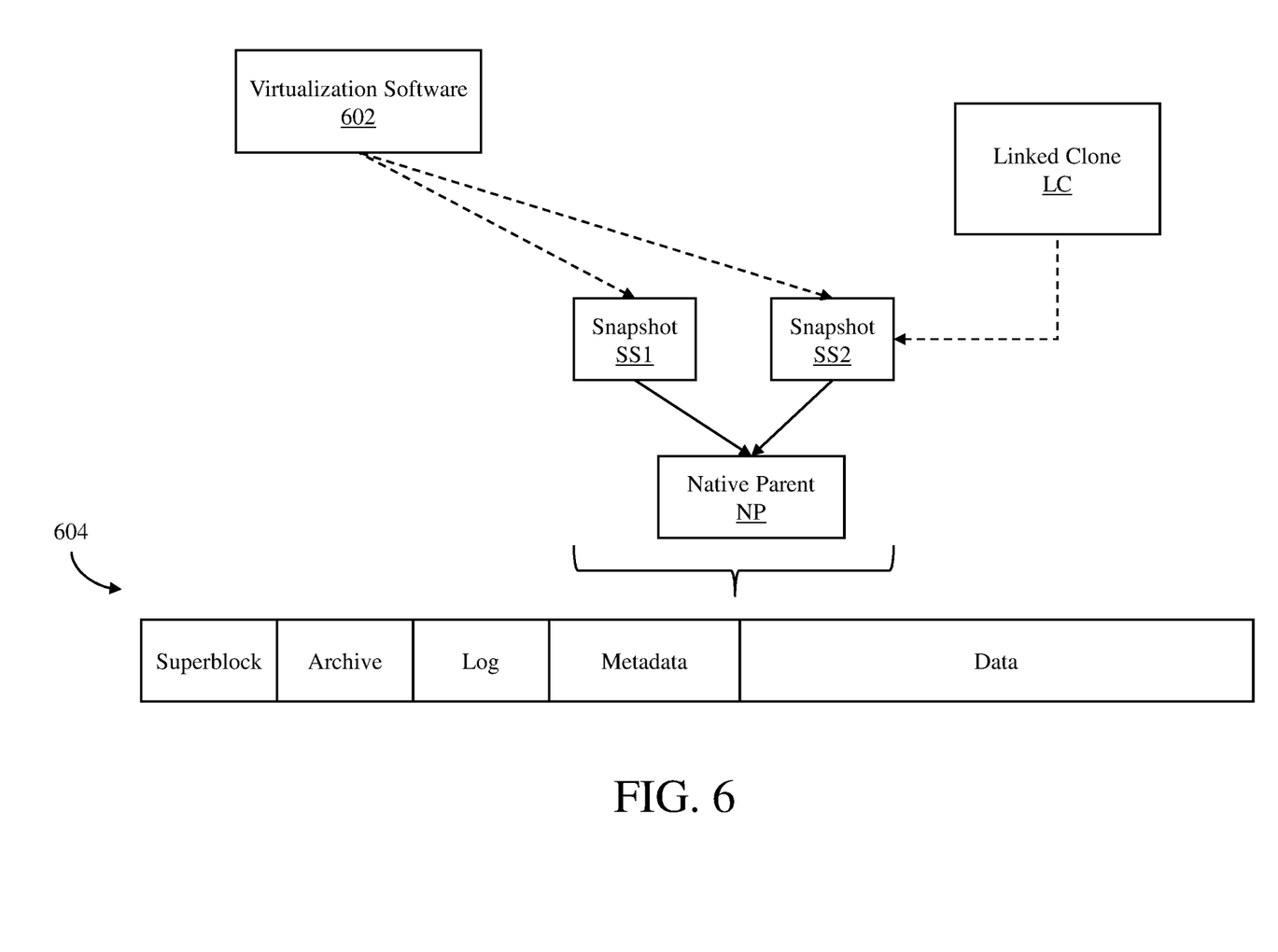
FIG. 6 illustrates a linked clone created from one of the snapshots of a storage object in a UPIT structure in accordance with an embodiment of the invention.

FIG. 6 shows a virtualization software 602 that is supporting a virtual machine and has created snapshots in a UPIT structure 604 for a virtual disk object of the virtual machine. In this example, the virtualization software 602 has created two snapshots SS1 and SS2 in response to user input. These snapshots are illustrated as a snapshot hierarchy contained in the UPIT structure 604. Thus, these snapshots SS1 and SS2 are referenced by a native parent NP. In addition, the snapshot SS2 references a linked clone LC, which has been created using the snapshot SS2. Thus, the snapshot SS2 should not be deleted if the linked clone LC is not deleted first. If a user of the virtualization software 602 wants to delete the snapshot SS2 and enters instructions to do so, the snapshot SS2 will not be deleted by the UPIT manager 104 unless the linked clone LC is first deleted.

Figure 7:
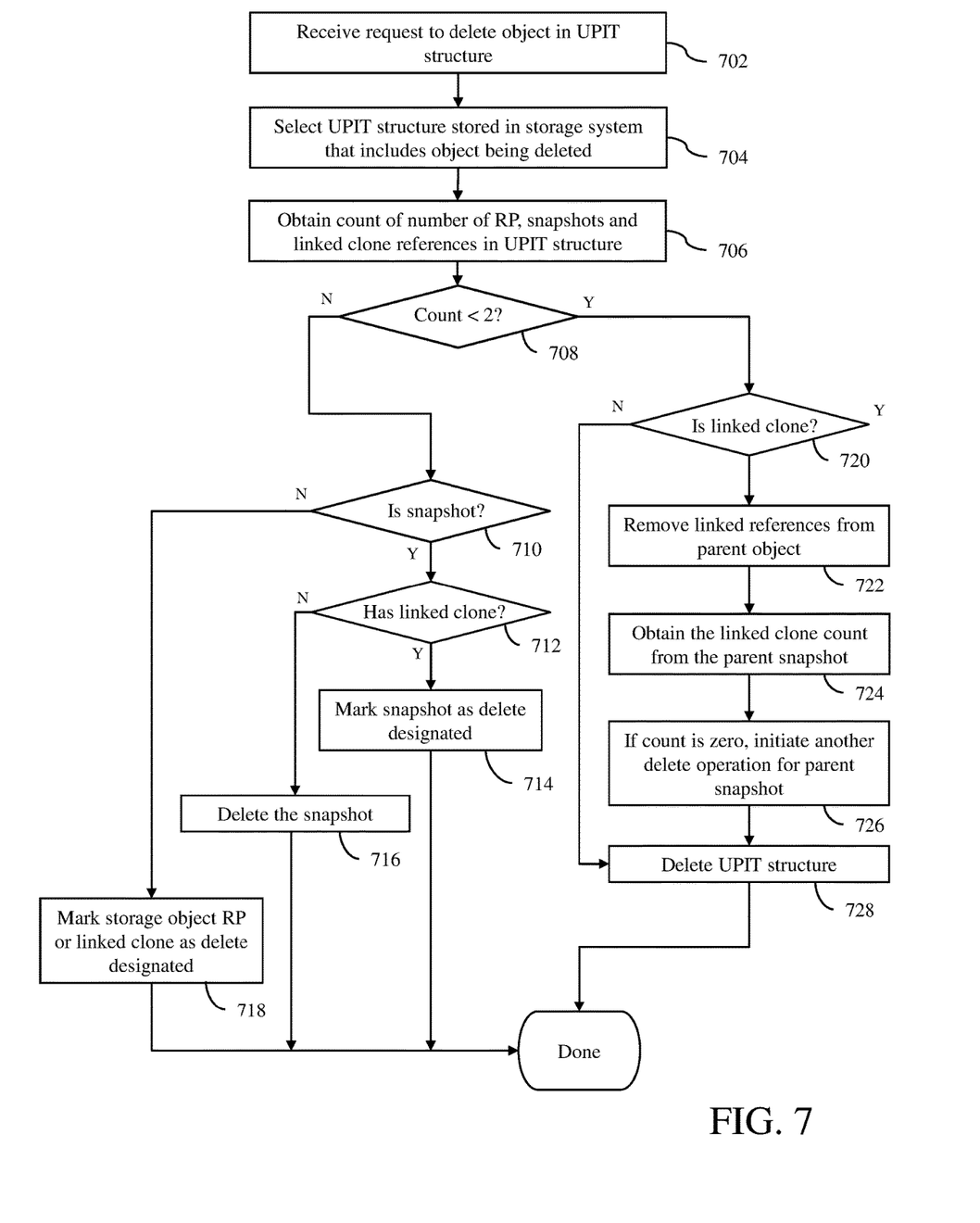
FIG. 7 is a flow diagram of an operation of the UPIT manager with respect to a delete request of a UPIT structure in accordance with an embodiment of the invention

The operation of the UPIT manager 104 with respect to a delete request of an object in a UPIT structure, which may be a storage object running point (RP), a snapshot of the storage object, a linked clone or a parent object of a linked clone, in accordance with an embodiment of the invention will now be described with reference to the flow diagram of FIG. 7. At block 702, a request to delete an object in the storage system 106 is received at the file system 102 from a requesting entity. As an example, the request may be from a virtualization software running on a host computer that is supporting a virtual machine or a data protection module running on one or more computers to delete a RP or snapshot of a namespace object or a virtual disk object. Next, at block 704, the UPIT structure stored in the storage system 106 that includes the requested storage object RP, the requested snapshot, the requested linked clone or the requested parent object of a linked clone is selected by the UPIT manager 104.

Next, at block 706, a count of RP, snapshots and linked clone references is obtained from the UPIT structure by the UPIT manager 104. In an embodiment, this count of RP, snapshots and linked clones may be obtained by reading entries in the archive section of the UPIT structure, which will indicate valid RP, snapshots and linked clones.

Next, at block 708, a determination is made whether the count is greater than two by the UPIT manager 104. If the count is not less than two, the operation proceeds to block 710. Otherwise, the operation proceeds to block 720. If the count is less than two, the object being deleted is either the last object in the UPIT structure or there are no valid objects in the UPIT structure so the UPIT structure should be deleted. A valid object is an object that has not been deleted or delete designated. If the count is not less than two, the object being deleted is not the last object in the UPIT structure so the UPIT structure should not be deleted.

At block 710, a determination is made whether the object being deleted is a snapshot by the UPIT manager 104. In an embodiment, this determination is made by reading information in the UPIT structure, e.g., the archive section, which would identify the object being deleted as a snapshot or not. If it is determined that the object is not a snapshot, which means that the object being deleted is a storage object RP or a linked clone, the operation proceeds to block 718, where the storage object RP or the linked clone is marked as delete designated without actually deleting the storage object RP or the linked clone in the UPIT structure by the UPIT manager 104. As a result, this storage object RP or the linked clone will not be included as reference in the UPIT structure even though it has not been deleted. The operation then comes to an end.

However, if it is determined that the object is a snapshot, the operation proceeds to block 712, where a determination is made whether the snapshot has a linked clone by the UPIT manager 104. In an embodiment, this determination is also made by reading information in the UPIT structure, e.g., the archive section, which would indicate whether a snapshot in the UPIT structure has reference to any linked clone. If it is determined that the snapshot has a linked clone, the operation proceeds to block 714, where the snapshot is marked as delete designated without actually deleting the snapshot in the UPIT structure by the UPIT manager 104. As a result, this snapshot will not be included as reference in the UPIT structure even though it has not been deleted by the UPIT manager 104. The operation then comes to an end.

However, if it is determined that the snapshot does not have a linked clone, the operation proceeds to block 716, where the snapshot is actually deleted by the UPIT manager 104. The operation then comes to an end.

Returning to block 708, if the count is less than two, the operation proceeds to block 720, where a determination is made whether the object being deleted is a linked clone by the UPIT manager 104. In an embodiment, this determination is made by reading information in the UPIT structure, e.g., the archive section, which would indicate whether the object is a linked clone or not. If it is determined that the object is not a linked clone, the operation proceeds to block 728, where the UPIT structure is deleted by the UPIT manager 104 since the object being deleted is the last object in the UPIT structure. The operation then comes to an end.

However, if it is determined that the object is a linked clone, the operation proceeds to block 722, where linked references from the parent object, which may also be a linked clone, are removed by the UPIT manager 104. In an embodiment, these linked references are stored in the UPIT structure of the parent object, e.g., in the archive section. Next, at block 724, the linked clone count is obtained from the parent snapshot by the UPIT manager 104. In an embodiment, this determination is made by reading information in the UPIT structure of the linked clone, e.g., the archive section. Next, at block 726, if the count is zero, which means that the parent snapshot should be deleted, another delete operation for the parent snapshot is initiated by the UPIT manager 104. Note that this will start the snapshot delete on the parent object starting at block 702. If UPIT manager realizes that this is the last reference in the object, it will delete the object. Otherwise, the UPIT manager will delete just this snapshot.

The delete operation then proceeds to block 728, where the UPIT structure is deleted by the UPIT manager 104 since the object being deleted is the last object in the UPIT structure. The operation then comes to an end.

In this manner, the UPIT manager 104 ensures that storage object RPs, which may be linked clones, and their snapshots are not actually deleted when these objects may be needed by other objects, e.g., linked clones. Thus, the described technique of managing snapshot and UPIT structures prevents data corruption.

Figure 8:
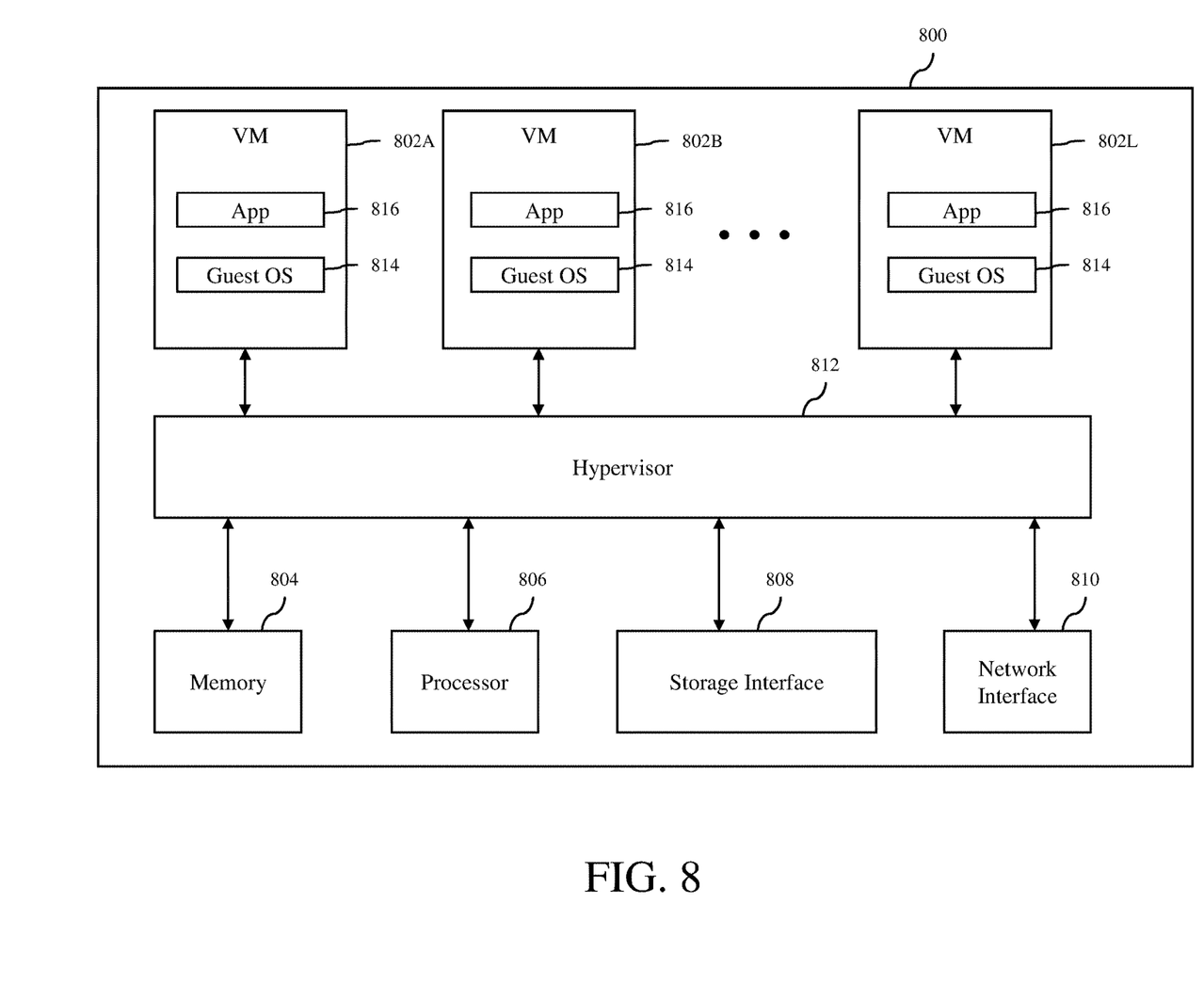
FIG. 8 is a block diagram of a physical computer system with a number of virtual machines in which the file system in accordance with an embodiment of the invention may be implemented.

The file system 102 may be implemented as part of an operating system (OS) of a computer system, which may be a physical computer system, such as a physical server, or a virtual computer system, such as a virtual machine. Turning now to FIG. 8, a physical computer system 800 in which the file system 102 may be implemented is shown. In FIG. 8, the physical connections between the various components of the computer system are not illustrated. As shown in FIG. 8, the physical computer system is configured to support a number of virtual machines (VMs) 802A, 802B . . . 802L (where L is a positive integer). The number of VMs supported by the physical computer system can be anywhere from one to more than one hundred. The exact number of VMs supported by the physical computer system is only limited by the physical resources of the physical computer system. The VMs share at least some of the hardware resources of the physical computer system, which include one or more system memories 804, one or more processors 806, a storage interface 808, and a network interface 810. Each system memory, which may be random access memory (RAM), is the volatile memory of the physical computer system. Each processor can be any type of a processor, such as a central processing unit (CPU) commonly found in a personal computer. The storage interface is an interface that allows that physical computer system to communicate with one or more physical storage systems. As an example, the storage interface may be a host bus adapter or a network file system interface. The network interface is an interface that allows the physical computer system to communicate with other devices through one or more computer networks. As an example, the network interface may be a network adapter.

In the illustrated embodiment, the VMs 802A, 802B . . . 802L run on "top" of a hypervisor 812, which is a software interface layer that, using virtualization technology, enables sharing of the hardware resources of the physical computer system 800 by the VMs. However, in other embodiments, one or more of the VMs can be nested, i.e., a VM running in another VM. Any computer virtualization architecture can be implemented. For example, the hypervisor may run on top of the physical computer system's operating system or directly on hardware of the physical computer system. With the support of the hypervisor, the VMs provide isolated execution spaces for guest software. Each VM may include a guest operating system 814, one or more guest applications 816. The guest operating system manages virtual system resources made available to the corresponding VM by the hypervisor, and, among other things, the guest operating system forms a software platform on top of which the guest applications run.

The file system 102 may be implemented in one or more VMs 802A, 802B . . . 802L running in the physical computer system 800 as part of their OS, i.e., the guest OS 814. Thus, in this implementation, the file system 102 allows guest applications 816 to access physical storage systems available to the physical computer system. The file system 102 may also be implemented in the physical computer system as part of the host OS. Thus, the file system 102 may be implemented in the OS of any physical or virtual computer system. In other embodiments, the file system 102 may be implemented as a distributed file system, where agents of the file system are installed in multiple physical or virtual computer systems.

Figure 9:
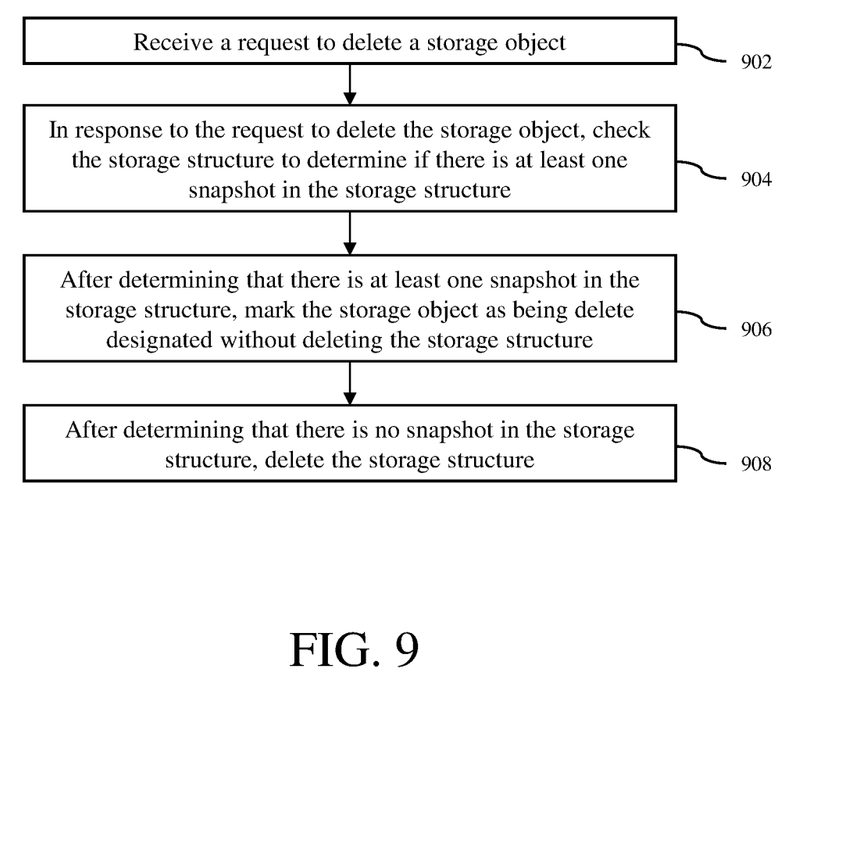
FIG. 9 is a flow diagram of a method for managing snapshots of storage objects stored in a storage system in accordance with an embodiment of the invention.

A method for managing snapshots of storage objects stored in a storage system in accordance with an embodiment of the invention is described with reference to a flow diagram of FIG. 9. At block 902, a request to delete a storage object stored in the storage system is received at a file system of a computer system. At block 904, in response to the request to delete the storage object, the storage structure is checked to determine if there is at least one snapshot in the storage structure by the file system. At block 906, after determining that there is at least one snapshot in the storage structure, the storage object is marked as being delete designated without deleting the storage structure by the file system. At block 908, after determining that there is no snapshot in the storage structure, the storage structure deleted by the file system.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing snapshots of storage objects stored in a storage system, the method comprising:
    receiving a request to delete a storage object stored in a storage structure in the storage system, wherein the storage structure is also used to store any snapshots of the storage object;
    in response to the request to delete the storage object, checking the storage structure to determine if there is at least one snapshot in the storage structure; and
    after checking the storage structure to determine if there is at least one snapshot in the storage structure, marking the storage object as being delete designated without deleting the storage structure when a determination is made that there is at least one snapshot in the storage structure and deleting the storage structure that includes the storage object when a determination is made that there is no snapshot in the storage structure.

2. The method of claim 1, wherein the storage structure includes snapshots created by different requesting entities.

3. The method of claim 2, wherein the different requesting entities include a data protection module and a virtualization software that supports one or more virtual computing instances.

4. The method of claim 1, wherein the storage object and the snapshot are both stored in the storage structure using a B+ tree structure.

5. The method of claim 1, wherein the storage structure includes at least an archive section, a metadata section and a data section, and wherein a reference to the snapshot of the storage object is stored in the archive section of the storage structure.

6. The method of claim 5, wherein checking the storage structure to determine if there is at least one snapshot in the storage structure includes reading the archive section of the storage structure to see if there is any reference to snapshots for the storage object in the storage structure.

7. The method of claim 1, further comprising:
    receiving a request to delete a snapshot of the storage object in the storage structure;
    in response to the request to delete the snapshot, determining whether an existing linked clone in the storage structure is associated with the snapshot; and
    after determining whether is an existing linked clone in the storage structure is associated with the snapshot, marking the snapshot in the storage structure as being delete designated without deleting the snapshot in the storage structure when a determination is made that there is an existing linked clone associated with the snapshot and deleting the snapshot in the storage structure when a determination is made that there is no existing linked clone associated with the snapshot.

8. The method of claim 1, wherein the storage object is a namespace object of a virtual machine or a virtual disk object of the virtual machine and the snapshot is a snapshot of the namespace object or the virtual disk object.

9. A non-transitory computer-readable storage medium containing program instructions for managing snapshots of storage objects stored in a storage system, wherein execution of the program instructions by one or more processors of a computer system causes the one or more processors to perform steps comprising:
    receiving a request to delete a storage object stored in a storage structure in the storage system, wherein the storage structure is also used to store any snapshots of the storage object;
    in response to the request to delete the storage object, checking the storage structure to determine if there is at least one snapshot in the storage structure; and
    after checking the storage structure to determine if there is at least one snapshot in the storage structure, marking the storage object as being delete designated without deleting the storage structure when a determination is made that there is at least one snapshot in the storage structure and deleting the storage structure that includes the storage object when a determination is made that there is no snapshot in the storage structure.

10. The computer-readable storage medium of claim 9, wherein the storage structure includes snapshots created by different requesting entities.

11. The computer-readable storage medium of claim 10, wherein the different requesting entities include a data protection module and a virtualization software that supports one or more virtual computing instances.

12. The computer-readable storage medium of claim 9, wherein the storage object and the snapshot are both stored in the storage structure using a B+ tree structure.

13. The computer-readable storage medium of claim 9, wherein the storage structure includes at least an archive section, a metadata section and a data section, and wherein a reference to the snapshot of the storage object is stored in the archive section of the storage structure.

14. The computer-readable storage medium of claim 13, wherein checking the storage structure to determine if there is at least one snapshot in the storage structure includes reading the archive section of the storage structure to see if there is any reference to snapshots for the storage object in the storage structure.

15. The computer-readable storage medium of claim 9, wherein the steps further comprise:
    receiving a request to delete a snapshot of the storage object in the storage structure;
    in response to the request to delete the snapshot, determining whether an existing linked clone in the storage structure is associated with the snapshot;

after determining whether is an existing linked clone in the storage structure is associated with the snapshot, marking the snapshot in the storage structure as being delete designated without deleting the snapshot in the storage structure when a determination is made that there is an existing linked clone associated with the snapshot and deleting the snapshot in the storage structure when a determination is made that there is no existing linked clone associated with the snapshot.

16. The computer-readable storage medium of claim 9, wherein the storage object is a namespace object of a virtual machine or a virtual disk object of the virtual machine and the snapshot is a snapshot of the namespace object or the virtual disk object.

17. A computer system comprising:
a storage system having computer data storage devices to store at least one storage structure;
memory; and
a processor configured to:
　receive a request to delete a storage object stored in a storage structure in the storage system, wherein the storage structure is also used to store any snapshots of the storage object;
　in response to the request to delete the storage object, check the storage structure to determine if there is at least one snapshot in the storage structure; and
　after checking the storage structure to determine if there is at least one snapshot in the storage structure, mark the storage object as being delete designated without deleting the storage structure when a determination is made that there is at least one snapshot in the storage structure and delete the storage structure that includes the storage object when a determination is made that there is no snapshot in the storage structure.

18. The computer system of claim 17, wherein the storage structure stored in the storage system includes snapshots created by different requesting entities.

19. The computer system of claim 17, wherein the storage object and the snapshot are both stored in the storage structure using a B+ tree structure.

20. The computer system of claim 17, wherein the processor is further configured to:
　receive a request to delete the snapshot of the storage object in the storage structure;
　in response to the request to delete a snapshot, determine whether an existing linked clone in the storage structure is associated with the snapshot;
　after determining whether an existing linked clone in the storage structure is associated with the snapshot, mark the snapshot as being delete designated without deleting the snapshot in the storage structure when a determination is made that there is an existing linked clone associated with the snapshot and deleting the snapshot in the storage structure when a determination is made that there is no existing linked clone associated with the snapshot.

* * * * *